US012811632B2

United States Patent

(12) United States Patent
Brigalda et al.

(10) Patent No.: US 12,811,632 B2
(45) Date of Patent: Nov. 24, 2026

(54) RECEIVED RADIO SIGNAL PROCESSING

(71) Applicant: NXP USA, Inc., Austin, TX (US)

(72) Inventors: Adriana Brigalda, Bucharest (RO); Filip Alexandru Rosu, Bucharest (RO)

(73) Assignee: NXP USA, INC., Austin, TX (US)

( * ) Notice: Subject to any disclaimer, the term of this patent is extended or adjusted under 35 U.S.C. 154(b) by 20 days.

(21) Appl. No.: 19/176,220

(22) Filed: Apr. 11, 2025

(65) Prior Publication Data

US 2026/0230120 A1 Aug. 6, 2026

(30) Foreign Application Priority Data

Jan. 31, 2025 (RO) .............................. a 2025 00042

(51) Int. Cl.
*H04B 7/0417* (2017.01)
*H04B 17/345* (2015.01)
(Continued)

(52) U.S. Cl.
CPC ......... *H04B 7/0417* (2013.01); *H04B 17/345* (2015.01); *H04L 27/0002* (2013.01); *H04L 27/265* (2013.01)

(58) Field of Classification Search
CPC .. H04B 1/0032; H04B 1/0039; H04B 7/0417; H04B 17/345; H04L 27/0002;
(Continued)

(56) References Cited

U.S. PATENT DOCUMENTS 5,410,750 A * 4/1995 Cantwell .............. H04B 1/7102 375/349
2010/0246377 A1* 9/2010 Zhang .................. H04B 7/0417 370/210
(Continued)

FOREIGN PATENT DOCUMENTS

CN 101355543 A 1/2009
EP 1550278 B1 1/2015

OTHER PUBLICATIONS

F. Jin et al.: "Automotive Radar Interference Mitigation Using Adaptive Noise Canceller" in IEEE Transactions on Vehicular Technology, vol. 68, No. 4, pp. 3747-3754, Apr. 2019.
(Continued)

*Primary Examiner* — Young T. Tse

(57) ABSTRACT

An apparatus and method for mitigating received interference are described. Baseband signals received during a time interval by a first MIMO receiver and a second MIMO receiver are provided as in-phase and quadrature input streams of a complex valued input of a Discrete Fourier Transform (DFT) circuit that calculates a complex valued DFT dataset of the complex valued input. A complex valued interference mitigated frequency domain dataset is produced by determining an interference mask from a spectrogram of the complex valued DFT dataset and applying the interference mask to the spectrogram. An inverse DFT of the complex valued interference mitigated frequency domain dataset determines an interference mitigated complex valued time domain data stream that contains a first interference mitigated time series as its real valued data and a second interference mitigated time series as its imaginary valued data.

20 Claims, 7 Drawing Sheets

300

(51) Int. Cl.
*H04L 27/00* (2006.01)
*H04L 27/26* (2006.01)

(58) Field of Classification Search
CPC ............... H04L 27/265; H04L 27/2651; H04L 27/26524; H04L 27/26526; H04L 27/34; H04L 27/38
USPC ........ 375/260, 262, 265, 267; 370/208, 210; 708/404, 405
See application file for complete search history.

(56) References Cited

U.S. PATENT DOCUMENTS

| | | | | |
|---|---|---|---|---|
| 2011/0261858 A1* | 10/2011 | Baldemair | ............ | H04L 5/0053 375/E1.001 |
| 2016/0157146 A1* | 6/2016 | Karabinis | ............ | H04B 17/102 370/334 |
| 2016/0182101 A1* | 6/2016 | Markovic | ............ | H04L 27/364 375/296 |
| 2022/0349986 A1 | 11/2022 | Wu et al. | | |
| 2023/0393236 A1 | 12/2023 | Wu et al. | | |
| 2024/0106685 A1* | 3/2024 | Dan | .................... | H04L 25/0268 |

OTHER PUBLICATIONS

Y. Wang et al.: "Mutual Interference Mitigation for Automotive FMCW Radar With Time and Frequency Domain Decomposition" in IEEE Transactions on Microwave Theory and Techniques, vol. 71, No. 11, pp. 5028-5044, Nov. 2023.

R. Muja et al.: "Real-Time Interference Mitigation in Automotive Radars Using the Short-Time Fourier Transform and L-Statistics" in IEEE Transactions on Vehicular Technology, vol. 73, No. 10, pp. 14617-14632, Oct. 2024.

U.S. Appl. No. 18/647,883, filed Apr. 26, 2024, not yet published, 36 pages.

S. Neemat et al.: "An Interference Mitigation Technique for FMCW Radar Using Beat-Frequencies Interpolation in the STFT Domain," in IEEE Transactions on Microwave Theory and Techniques, vol. 67, No. 3, pp. 1207-1220, Mar. 2019.

* cited by examiner

100

300

400

500

600

700

900

RECEIVED RADIO SIGNAL PROCESSING

CROSS-REFERENCE TO RELATED APPLICATIONS

This application claims priority under 35 U.S.C. § 119 to Romanian patent application no. A202500042, filed 31 Jan. 2025, the contents of which are incorporated by reference herein.

TECHNICAL FIELD

Embodiments of the present invention generally relate to processing of received radio signals, and more particularly relate to efficiently processing received signals to improve received signal quality.

BACKGROUND

Radio receivers often perform digital processing of received signals to extract information. One application that uses digital processing of received signals is Multiple Input Multiple Output (MIMO) radio systems such as MIMO radar systems that transmit and receive Frequency Modulated Continuous Wave (FMCW) signals. Such radio receivers often include specialized digital signal processing circuits that perform a limited number of specialized operations on received signals. These digital signal processing circuits include architectures that are targeted to performing specialized digital signal processing operations.

BRIEF DESCRIPTION OF THE DRAWINGS

Embodiments of the present invention are illustrated by way of example and are not limited by the accompanying figures, in which like references indicate similar elements. Elements in the figures are illustrated for simplicity and clarity and have not necessarily been drawn to scale.

DETAILED DESCRIPTION

Figure 1:
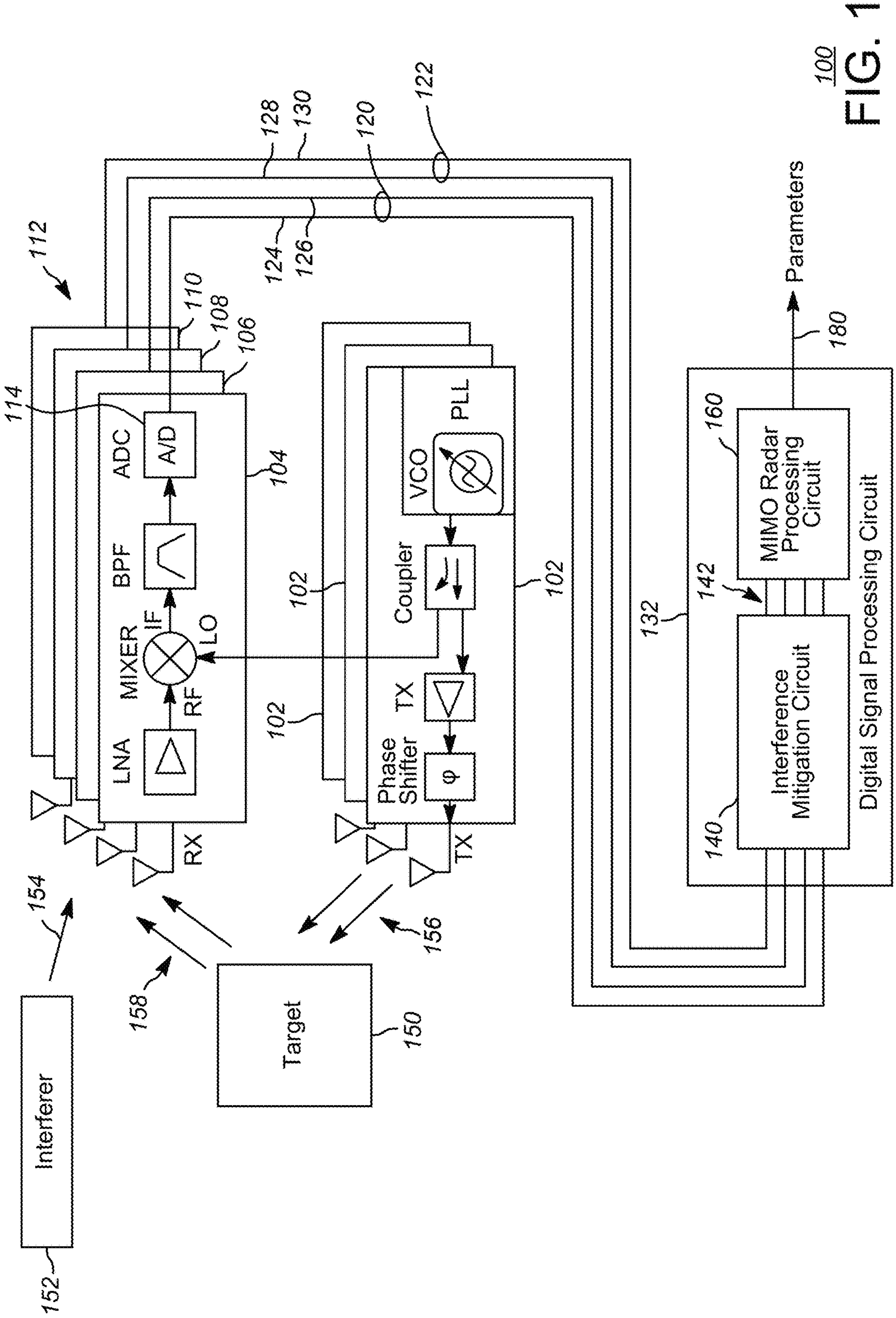
FIG. 1 illustrates a Frequency Modulated Continuous Wave (FMCW) Multiple Input Multiple Output (MIMO) radar system, according to an example.

The below described systems and methods provide signal processing techniques that leverage available digital signal processing operations processing provided by existing specialized digital signal processing circuits to accelerate interference mitigation processing on received Multiple Input Multiple Output (MIMO) signals. These systems and methods utilize specialized hardware designed to efficiently perform the Short Time Fourier Transform (STFT) processing of complex valued time sequence signals (i.e., signal values that include in-phase and quadrature time samples) to contemporaneously and efficiently process two real valued time sample data streams produced by two MIMO receiver channels. These systems and methods process time sample baseband data produced by two receiver channels of a MIMO receiver to determine complex valued STFT values, i.e., frequency domain values, of those baseband signals. An interference mitigation mask is determined from the complex STFT values determined for the pair of baseband data. This interference mitigation mask is then applied to the STFT values determined for the first pair of baseband data and the same interference mask is also applied to STFT values determined for subsequent pairs of baseband data that were received during the same time interval to reduce detected interference signals. After applying the mitigation mask, an inverse STFT (iSTFT) process is applied to the STFT values to produce two real valued time sample data streams that correspond to the received signals but that have had interference mitigation applied.

The below systems and methods operate to efficiently perform parallel processing of two MIMO receiver channels using a digital signal processor that processes complex valued signals. In some examples, the digital signal processor includes an STFT processor to determine STFT frequency domain data for digitized complex valued baseband time domain received signals that are produced by a receiver channel with separate in-phase and quadrature receiver channel digitizers. In some examples, real valued data samples from two MIMO receiver channels are provided to the real and imaginary components of complex valued time domain inputs to the STFT processor. The STFT processor then computes complex valued STFT frequency domain data for the complex valued time domain inputs that were created from the real valued samples produced by two MIMO receiver channels as described above. The use of such an STFT circuit to more efficiently process signals received by two MIMO receiver channels in parallel greatly improves the efficiency and operation of a device that incorporates such hardware that is not conventionally used for such processing.

In some examples, the below described systems and methods include a digital signal processor that is part of or that operates with a MIMO receiver configured to process FMCW signals. The digital signal processor in such examples concurrently receives digitized values of received signals produced by pairs of any number of MIMO receiver channels are able to be separately processed by that digital signal processor to produce a single stream of complex valued STFT frequency domain data.

The below systems and methods further describe various methods for determining an interference mitigation mask, or interference mask, to be applied to the complex valued STFT frequency domain data. In an example, the interference mask is determined based on the spectrograms of the complex valued STFT frequency domain data. A spectrogram is a dataset that contains the magnitude values of the complex valued STFT frequency domain data where that complex valued STFT frequency domain data is calculated for the above-described complex time domain data that consists of time samples of received signals combined as real and imaginary values to be used to calculate complex valued STFT frequency domain data. In an example, the interference mitigation mask includes a set of weights to be applied to the values of the STFT data. In an example, the interference mask is determined for STFT data that is determined for the first pair of MIMO receiver channels during each received chirp period. That same interference mask in such examples is able to be applied to the STFT data determined for data captured during the same time interval by other MIMO receiver channels. After applying the interference mitigation mask to the STFT data, an iSTFT process is performed on that STFT data to create a time sequence data stream for the two baseband signals produced by the two MIMO receiver channels with reduced interfering signal. In some examples, the same digital signal processor performs the STFT and the iSTFT process.

The below described systems and method utilize various techniques to determine interference mitigation masks. In some examples, the digital signal processor circuit that performs the STFT process is used to perform the processing to determine the interference mitigation mask. In some other examples, data is transferred from that digital signal processor circuit to another processor circuit to perform further processing to determine the interference mitigation map that is to be applied to the STFT data.

FIG. 1 illustrates a Frequency Modulated Continuous Wave (FMCW) Multiple Input Multiple Output (MIMO) radar system 100, according to an example. The FMCW MIMO radar system 100 includes a number of transmitter channels 102 and a set of receiver channels 112. The illustrated FMCW MIMO radar system 100 includes three (3) transmitter channels 102 and the set of receiver channels 112 that includes a first receiver channel 104, a second receiver channel 106, a third receiver channel 108 and a fourth receiver channel 110. Each transmitter channel and receiver channel has its own antenna to utilize MIMO transmission paths between each transmitter channel and each receiver channel. In an example, the FMCW MIMO radar system 100 performs radar processing of signals received by each receiver channel in the receiver channels 112 to detect and determine various parameters associated with objects that reflect signals transmitted by the transmitter channels 102. In order to simplify the description of relevant aspects of the described systems and methods, a FMCW MIMO radar system 100 with three (3) transmitter channels and four (4) receiver channels is depicted. It is to be understood that further systems are able to have any number of transmitter channels and receiver channels.

The transmitter channels 102 transmit a set of transmitted signals 156 where each transmitter channel in the transmitter channels 102 transmits its own signal. The transmitted signals 156 hit an object 150 and are reflected as reflected signals 158 that are received by each receiver channel in the set of receiver channels 112. In an example, the transmitter channels 102 generate and transmit transmitted signals that are modulated as chirped FM radar signals.

Each receiver channel in the set of receiver channels 112, such as the first receiver channel 104, includes a receiver processing chain as depicted that includes a Low Noise Amplifier (LNA), Mixer, and a BandPass Filter (BPF). This receiver channel processing chain produces a down converted received signals. As depicted, the receiver channels 112 receive a Local Oscillator (LO) signal from a transmitter channel 102 in order to synchronize transmitted and received Radio Frequency (RF) signals. The first receiver channel 104 is shown to have an Analog-to-Digital Converter (ADC) 114 that converts the down converted received signals into a digitized time sequence of data samples. The ADC 114 in the illustrated example produces real valued samples, and not complex valued samples that would include in-phase and quadrature values such as may be produced for a baseband signal. The second receiver channel 106, third receiver channel 108, and fourth receiver channel 110 have similar Analog-to-Digital Converters (not shown) that produce similar real valued digitized time sequences of data samples representing the signal received by that receiver channel.

In addition to receiving the reflected signals 158, an interferer 152 that transmits an interfering signal 154 may be in the vicinity of the receiver channels 112. The interfering signal 154 in some circumstances is also received by the receiver channels 112 and is also present in the digitized time sequence of data samples produced by the receiver channels 112.

The first receiver channel 104 produces a first digitized time sequence of data samples 124, the second receiver channel 106 produces a second digitized time sequence of data samples 126, the third receiver channel 108 produces a third digitized time sequence of data samples 128, and the fourth receiver channel 110 produces a fourth digitized time sequence of data samples 130. The four (4) receiver channels of the illustrated FMCW MIMO radar system 100 are shown as being arranged as two pairs of digitized time sequences of data samples. A first pair of digitized time sequences of data samples 120 includes the first digitized time sequence of data samples 124 and the second digitized time sequence of data samples 126. A second pair of digitized time sequences of data samples 122 includes the third digitized time sequence of data samples 128 and the fourth digitized time sequence of data samples 130.

These digitized time sequences of data samples from all of the receiver channels 112 are provided to a digital signal processing circuit 132 for processing to produce parameters 180 regarding the object 150, such as range and velocity of the object 150 relative to the receiver channels 112. In the illustrated example, the digital signal processing circuit 132 has processing circuits that are used to efficiently process pairs of received MIMO channel data in parallel. In this example, the digital signal processing circuit 132 includes circuits that are able to efficiently process pairs of digitized time sequences of data samples in parallel, such as the first pair of digitized time sequences of data samples 120 and the second pair of digitized time sequences of data samples 122, to more efficiently perform interference mitigation for the received signals.

The digital signal processing circuit 132 includes an interference mitigation processing circuit 140 and a MIMO radar processing circuit 160. The interference mitigation processing circuit 140 utilizes a portion of the digital signal processing circuit 132 that is able to efficiently process pairs of digitized time sequences of data samples in parallel. In an example, the interference mitigation processing circuit 140 is configured to perform parallel processing of the first digitized time sequence of data samples 124 and the second digitized time sequence of data samples 126 of the first pair of digitized time sequences of data samples 120, and then perform parallel processing of the third digitized time sequence of data samples 128 and the fourth digitized time sequence of data samples 130 of the second pair of digitized time sequences of data samples 122 to more efficiently perform interference mitigation for the received signals. In examples with more than four (4) receiver channels, all further pairs of digitized time sequences of data samples from those other receiver channels are continued to be similarly processed.

The interference mitigation processing circuit 140, in an example, processes the received signals to remove interfering signals, such as the above-described interfering signal 154, that are received by the receiver channels 112 to produce interference mitigated time domain signals 142. The interference mitigated time domain signals 142, in an example, include a separate digitized time domain data stream for each downconverted received signal produced by the receiver channels 112. The MIMO radar processing circuit 160 in some examples processes the interference mitigated time domain signals 142 to produce parameters 180 that include data that is determined based on processing of the received digitized time sequences of data samples.

Figure 2:
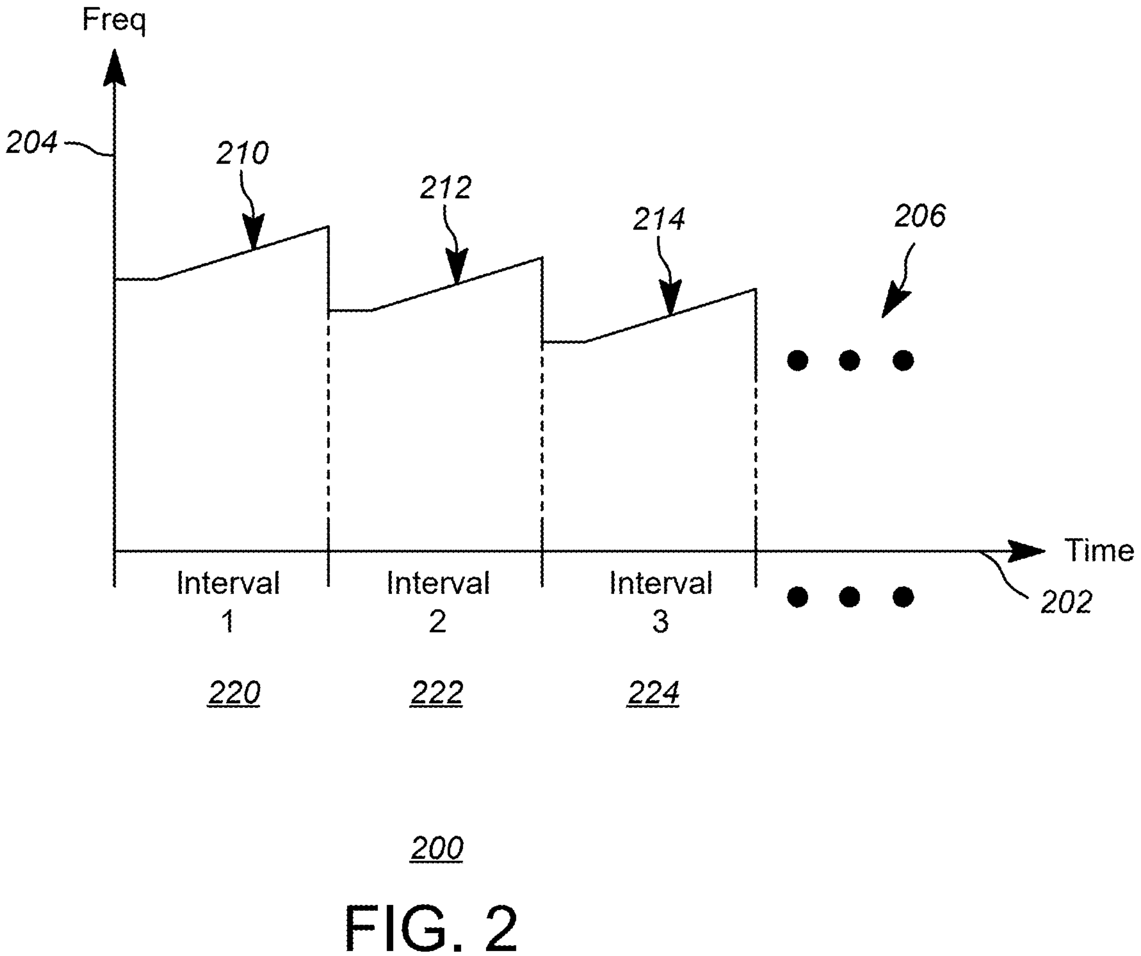
FIG. 2 illustrates a FMCW waveform and Short Time Fourier Transform (STFT) interval diagram, according to an example.

FIG. 2 illustrates a Frequency Modulated Continuous Wave (FMCW) waveform and Short Time Fourier Transform (STFT) interval diagram 200, according to an example. The FMCW waveform and STFT interval diagram 200 depicts a frequency vs. time waveform 206 of a frequency chirped FMCW radar signal. The FMCW waveform and STFT interval diagram 200 includes a time axis 202 and a frequency axis 204.

The frequency vs. time waveform 206 depicts the frequency over time of a frequency chirped continuous wave radar signal, such as is transmitted by the above-described transmitter channels 102 as the transmitted signals 156. The frequency vs. time waveform 206 depicts three (3) chirp intervals, a first chirp interval 210, a second chirp interval 212, and a third chirp interval 214. The FMCW waveform and STFT interval diagram 200 depicts a frequency vs. time waveform 206 with three (3) chirp intervals for ease of description but, in general, the transmitted FMCW waveforms consist of a larger number of repeating chirp intervals.

In the illustrated example, the FMCW waveform and STFT interval diagram 200 depicts a number of sampling intervals along the time axis. The time axis 202 depicts an interval 1 220, an interval 2 222, and an interval 3 224. In the illustrated example, these intervals coincide with the illustrated chirp period. In an example, processing by the digital signal processing circuit 132 performs a separate Short Time Fourier Transform (STFT) for digitized samples of each baseband signal of each of these intervals. In general, the interval over which STFTs are calculated are able to align or not align with the chirp intervals and, in some examples, the intervals over which STFTs are calculated may overlap each other.

Figure 3:
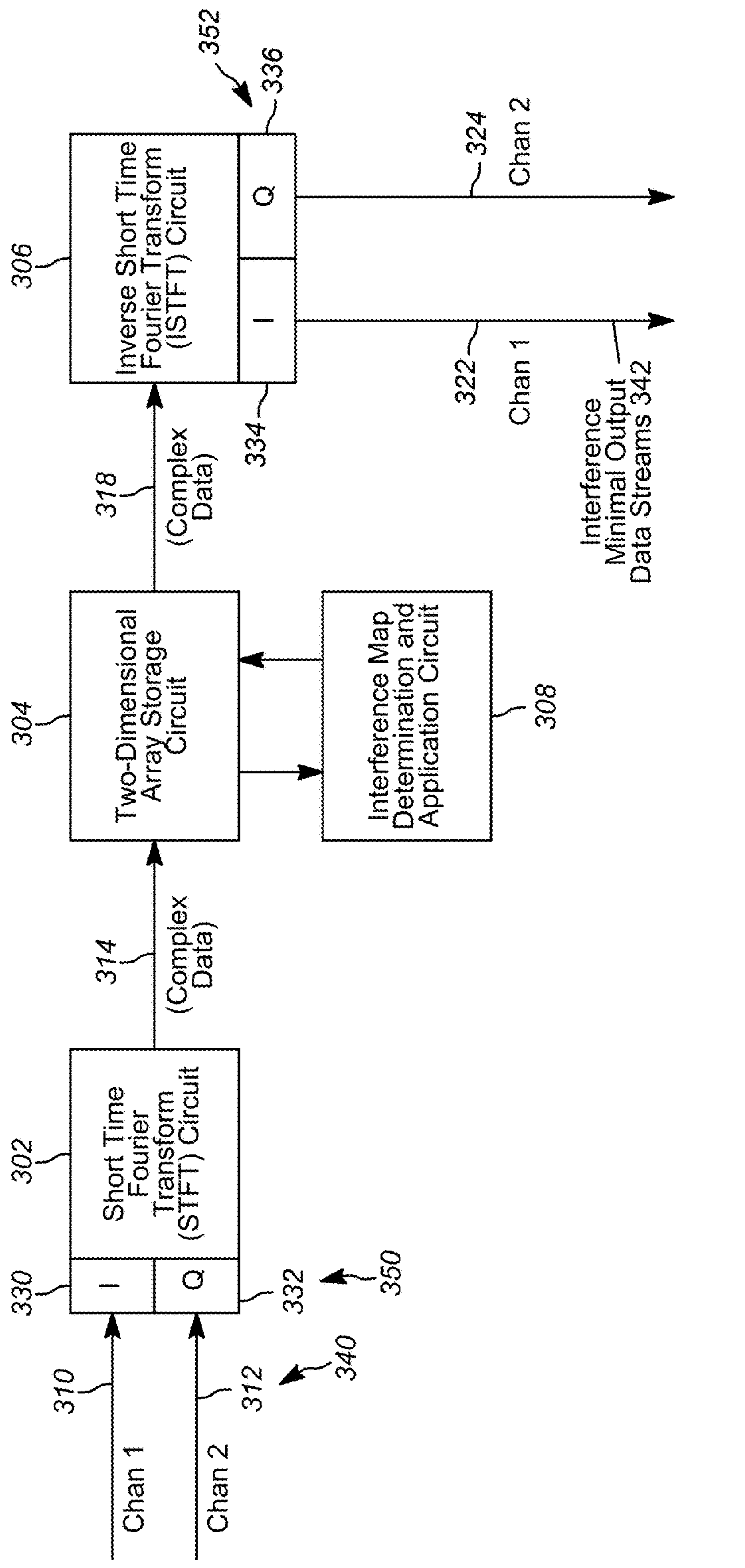
FIG. 3 illustrates a MIMO signal processing circuit block diagram, according to an example.

FIG. 3 illustrates a MIMO signal processing circuit block diagram 300, according to an example. The MIMO signal processing circuit block diagram 300 is a block diagram of an interference mitigating received signal processor circuit and depicts components that are included in an example of the interference mitigation processing circuit 140 described above.

The MIMO signal processing circuit block diagram 300 includes a Short Time Fourier Transform (STFT) circuit 302. In an example, the STFT circuit 302 is designed to receive digitized input time domain data streams via an In-phase (I) channel and a Quadrature (Q) channel. The STFT circuit 302 is an example of a Discrete Fourier Transform (DFT) circuit that calculates Discrete Fourier Transforms on received time domain signals on received complex valued time domain signals that include in-phase data and quadrature data to produce a complex valued Discrete Fourier Transform frequency domain dataset that has a real component and an imaginary component.

The design of the STFT circuit 302 processes these complex valued digitized time domain data streams as the two components of the complex numbers that represent a baseband signal samples such as is produced by certain types of receiver channels. Each complex data value, e.g., time sample, received by the STFT circuit 302, e.g., a value "Z," is able to be represented as having a real component "x," which corresponds to the data received by the In-phase input (I) channel 330, and an imaginary component "y," which corresponds to the data received by the Quadrature input (Q) channel 332. The complex value is able to be represented as Z=x+jy. The systems and methods described herein operate to take advantage of the concurrent processing performed by the STFT circuit 302 to process these two channels of data to produce STFT data.

In the presently described systems and methods, the STFT circuit 302 includes a received signal baseband input 350 that is configured to receive a received time domain signal 340 that consists of two digital input streams from two MIMO receiver channels of the set of receiver channels 112. In the illustrated example, the In-phase (I) input channel 330 of the received signal baseband input receives a first set of baseband signal values as a first channel data stream 310, and the Quadrature (Q) input channel 332 of the received signal baseband input receives a second set of baseband signal values as a second channel data stream 312. In an example, these two digital input data streams are the two digitized time sequences of data samples that are created by the respective Analog-to-Digital Converters of two receiver channels within the receiver channels 112 during the same time interval. In one phase of operations, the I input 330 and Q input 332 are able to be configured to receive and process a pair of digitized time sequences of data samples, such as the first pair of digitized time sequences of data samples 120 or the second pair of digitized time sequences of data samples 122, in order to reduce the time used by the STFT circuit 302 to process those pairs of digitized time sequences of data samples. In an example, different pairs of digitized time sequence of data samples are sequentially received and processed by the STFT circuit 302 in order to process all of the pairs digitized time sequences of data samples produced by the receiver channels 112.

The STFT circuit 302 receives and performs an STFT process on the time domain input data samples, such as the first channel data stream 310 and the second channel data stream 312, to produce data vectors that contain complex valued STFT frequency domain data 314. The STFT circuit 302, in an example, accumulates a set of time domain input data samples that were collected over each sampling interval as described above with regards to the STFT interval diagram 200. The STFT circuit 302 performs a DFT on each of those sets of time domain input data to determine a respective frequency domain data vector that represents the frequency content of that set of time domain input data. Each frequency domain data vector contains a set of complex valued elements that represent the energy present at each frequency during the sample interval as determined by the DFT calculation. The complex valued STFT frequency domain data 314 consists of a sequence of such frequency domain data vectors.

The complex valued STFT frequency domain data 314 is stored into a two-dimensional array storage circuit 304. In various examples, the two-dimensional structure of the two-dimensional array storage circuit 304 is able to be a conceptual structure where the data is stored in a linear or other arrangement but can be conceptualized as a two-dimensional storage to facilitate understanding of underlying data processing. The two-dimensional array storage circuit 304, in an example, stores each STFT frequency domain vector, which represents complex values of frequency components of the time domain samples collected over a particular sample interval, in one dimension of its two-dimensional structure. A sequence of STFT frequency domain vectors is stored in successive columns of the two-dimensional array storage circuit 304.

In an example, once a number of STFT frequency domain vectors has been determined and stored into the two-dimensional array storage circuit 304, an interference mask determination and application circuit 308 processes the data accumulated and stored in the two-dimensional array storage circuit 304 to determine an interference mask based on a spectrogram dataset calculated for the data stored in the two-dimensional array storage circuit 304. In an example, a spectrogram dataset is a dataset containing data indicating a respective magnitude of each complex valued DFT, or STFT, element of the frequency domain dataset. This interference mask is able to be used to remove interfering signals from the STFT data stored in the two-dimensional array storage circuit 304. The interference mask determination and application circuit 308 applies this interference mask to the data stored in the two-dimensional array storage circuit 304. Examples of determining and applying such an interference mask are described below. In some examples, some or all of the processing performed by the interference mask determination and application circuit 308 is defined by software processing performed by data processing circuits within the MIMO signal processing circuit block diagram 300.

After the interference mask has been applied to the STFT frequency domain data stored in the two-dimensional array storage circuit 304, the two-dimensional array storage circuit 304 contains an STFT dataset defining frequency components of signals received by the two receiver channels that provided the received time domain signal 340 and that have been processed to mitigate, e.g., reduce or remove, detected interfering signals therefrom. After processing by the interference mask determination and application circuit 308, the complex valued interference mitigated STFT data 318 is provided from the two-dimensional array storage circuit 304 to an inverse short time Fourier transform (iSTFT) circuit 306.

The iSTFT circuit 306 is an example of an inverse Discrete Fourier Transform circuit that performs an inverse Discrete Fourier Transform of the complex valued interference mitigated frequency domain dataset to determine an interference mitigated complex valued time domain data stream, produces a first interference mitigated time series based on real valued data within the interference mitigated complex valued time domain data stream, and produces a second interference mitigated time series based on imaginary valued data within the interference mitigated complex value time domain data stream.

The iSTFT circuit 306 processes the complex valued interference mitigated STFT data 318 to produce a complex valued time domain dataset 342 at a frequency domain output 352 via an In-phase (I) output 334, which produces a real component dataset, and a Quadrature (Q) output 336, which produces an imaginary component dataset. These two components of the complex valued time domain dataset 342 are a first interference mitigated output stream 322 and a second interference mitigated output stream 324. In this example, the first interference mitigated output stream 322 corresponds to the signal represented by the first channel data stream 310 with detected interference removed and the second interference mitigated output stream 324 corresponds to the signal represented by the second channel data stream 312 with the detected interference removed. In an example, the components of the complex valued time domain dataset 342 are able to be provided to a MIMO radar processing circuit 160 for further processing.

The above processing can be expressed mathematically as follows.

The first channel data stream 310 is expressed as:

$$x_1 = A_1\cos(2\pi f_b n T_s + \theta_1)$$

The second channel data stream 312 is expressed as:

$$x_2 = A_2\cos(2\pi f_b n T_s + \theta_2)$$

The STFT circuit 302 performs the following function for the above two input data streams to calculate a complex valued dataset Z that is stored in the two-dimensional array storage circuit 304:

$$Z = STFT\{x_1 + jx_2\}$$

The interference mask determination and application circuit 308 performs the following determination of the interference mask M and applies the interference mask M to leave Z0 in the two-dimensional array storage circuit:

$$M = \text{Compute Mask on } |Z|$$

$$Z^0 = MZ$$

The iSTFT circuit 306 performs the following to calculate a complex output:

$$x_0 = iSTFT\{Z^0\}$$

The two components of the complex output form $\hat{x}_1$, which is the first interference mitigated output stream 322, and $\hat{x}_2$, which is the second interference mitigated output stream 324:

$$\hat{x}_1 = Re\{x_0\}$$

$$\hat{x}_2 = \text{Im}\{x_0\}$$

In an example, after determining an interference mask for complex valued DFT, or STFT, frequency domain data that is based on a first set of baseband signal values and a second set of baseband signal values that were received during a particular time interval, as is described above, the same interference mask is able to be applied to subsequent spectrograms determined for subsequent complex DFT, or STFT, frequency domain datasets that are created for other pairs of sets of baseband signal values that were received during the same particular time interval. In such an example, the received signal baseband input 350 is configured receive a third set of baseband signal values and a fourth set of baseband values that are received during the same time interval as the first set of baseband values and the second set of baseband values that are discussed above.

The third set of baseband signal values is provided by a third MIMO receiver channel to the In-phase input channel 330, and to a fourth set of baseband signal values received during the first time interval by a fourth MIMO receiver channel are provided to the Quadrature input channel 332. In such an example, the interference map determination and application circuit 308 is further configured to, when operating, apply, subsequent to determining the interference mask, the interference mask to a subsequent spectrogram dataset to calculate a subsequent complex valued interference mitigated frequency domain dataset, where the subsequent spectrogram dataset determined for a subsequent complex DFT or STFT frequency domain dataset calculated for the third set of baseband signal values and the fourth set of baseband signal values. The iSTFT circuit 306, which is an example of an inverse DFT circuit, is further configured to, when operating perform an iSTFT or inverse DFT of the subsequent complex valued interference mitigated frequency domain data to determine a subsequent interference mitigated complex valued time domain data stream, produce a subsequent first interference mitigated time series based on real valued data within the interference mitigated complex valued time domain data stream, and produce a subsequent second interference mitigated time series based on imaginary valued data within the interference mitigated complex value time domain data stream.

Figure 4:
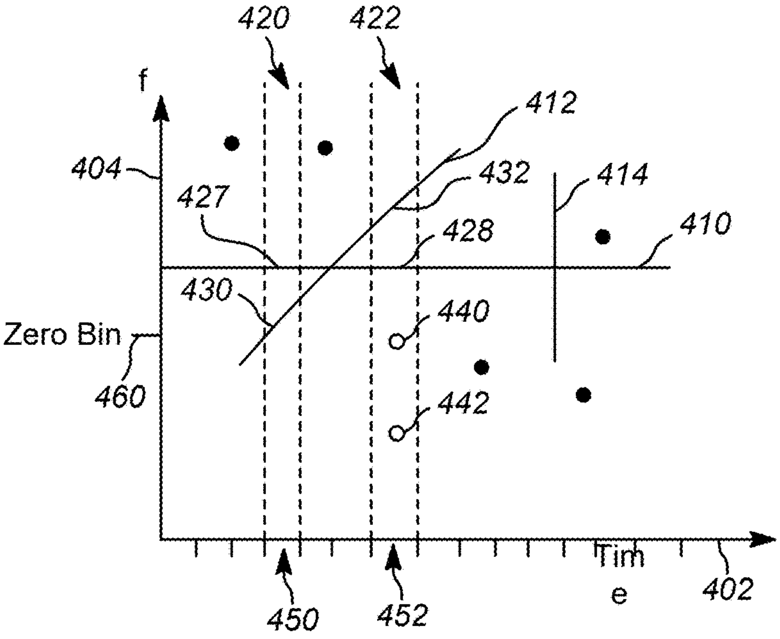
FIG. 4 illustrates a received signal spectrogram, according to an example.

FIG. 4 illustrates a received signal spectrogram 400, according to an example. The received signal spectrogram 400 depicts spectrogram dataset that is based on a set of complex valued STFT frequency domain data 314 that is stored in the above-described two-dimensional array storage circuit 304. In an example, the received signal spectrogram 400 represents the magnitude squared of the complex values stored in each location of the two-dimensional array storage circuit 304. In general, a received signal spectrogram 400 depicts relative amplitudes of the magnitude of each complex value of the two-dimensional data, but the illustrated received signal spectrogram 400 depicts two level data, e.g., "present" or "not present" indications of each complex value in order to simplify the presentation of such data and more concisely describe the relevant aspects of the present systems and methods.

The received signal spectrogram 400 has a time axis 402 that reflects the column of the two-dimensional array storage circuit 304 that stores a particular STFT vector. The time axis 402 thus reflects the sample interval during which time domain data was captured to create the STFT vector corresponding to a particular vertical column of the received signal spectrogram 400. The received signal spectrogram 400 has a frequency axis 404 that indicates the frequency bin of the STFT data of each STFT vector. The depicted frequency axis 404 has a zero (0) bin 460 that indicates the zero frequency bin of the STFT vector data. In the illustrated example, the STFT data includes frequency domain data that has positive and negative frequency components that are divided by the zero bin 460.

The received signal spectrogram 400 depicts a reflected received signal 410 that corresponds to reflected signals 158 as they are received by a receiver channel in the set of receiver channels 112. The received signal spectrogram 400 further depicts a first interfering signal 412 and a second interfering signal 414. Also depicted are a number of short duration interfering signals that appear as dots in the received signal spectrogram 400, such as the first short time interferer 440 and the second short time interferer 442. In the example of a frequency chirped FMCW radar, a transmitted radar signal reflection creates a horizontal line in the received signal spectrogram 400 because the transmitted and received signal chirp rates are synchronized, but the frequency of that signal reflects the distance to the object 150 that is reflecting the signal over which the transmitted signal travels. Interfering signals generally do not have synchronized frequency ramps that are synchronized with the receiver channel and thus generally cause a diagonal line, such as is the case of the first interfering signal 412, to appear in the received signal spectrogram 400. Other interferers, such as a wide bandwidth interferer causing the second interfering signal 414, are able to present as various shapes in the received signal spectrogram but are very unlikely to cause a horizontal line over a significant number of sampling intervals.

The received signal spectrogram 400 indicates a first STFT vector 420 and a second STFT vector 422. The first STFT vector 420 and the second STFT vector 422 depicts the amplitudes of signals captured during a particular sampling interval such as the sampling intervals described above with respect to the FMCW waveform and STFT interval diagram 200. In the illustrated example, the first STFT vector 420 depicts DFT data of time domain data captured during a first indicated time interval 450 and the second STFT vector 422 depicts DFT data of time domain data captured during a second indicated time interval 452. The first STFT vector 420 is shown to intersect the first interfering signal 412 at a first interfering signal first intercept point 430. The first STFT vector is shown to intercept the reflected received signal 410 at a first received signal intercept point 427. The second STFT vector 422 is shown to intercept the first interfering signal 412 at a first interfering signal second intercept point 432 and to intercept the reflected receive signal 410 at a second received signal intercept point 428. The second STFT vector 422 further captures the first short time interferer 440 and the second short time interferer 442. The data within these two vectors are described in further detail below.

Figure 5:
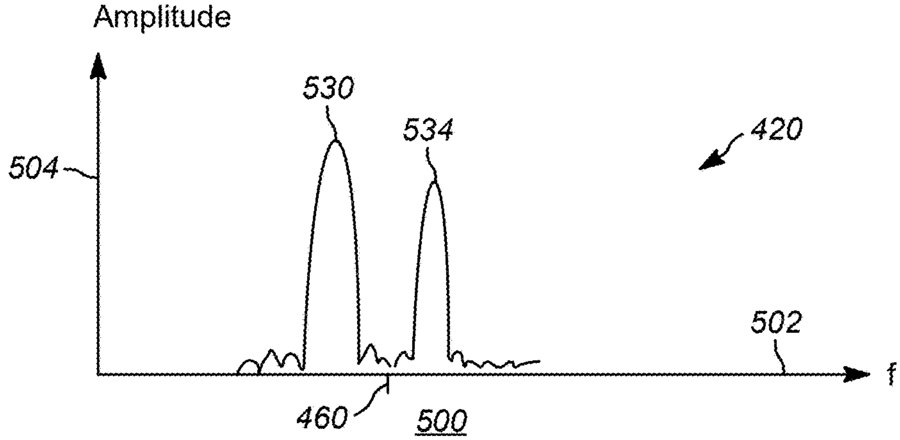
FIG. 5 illustrates a first STFT spectrum, according to an example.

FIG. 5 illustrates a first STFT spectrum 500, according to an example. The first STFT spectrum 500 is a frequency vs. amplitude plot of the first STFT vector 420 that corresponds to a Fourier transform of time sample data collected during a sampling interval that corresponds to the first depicted time interval 450. The first STFT spectrum 500 has a frequency axis 502, which corresponds to the frequency axis 404 described above and that includes the zero bin 460, and an amplitude axis 504 that depicts the amplitude of the frequency components of the first STFT vector 420. The first STFT spectrum 500 depicts amplitude values of each component of the first STFT vector 420 as opposed to the simplified indications presented in the received signal spectrogram 400. The first STFT vector 420 has a first vector first spectral peak 530 which corresponds the first interfering signal first intercept point 430 discussed above. The first STFT spectrum 500 also has a first vector second spectral peak 534 that corresponds the first received signal first intercept point 427 discussed above.

Figure 6:
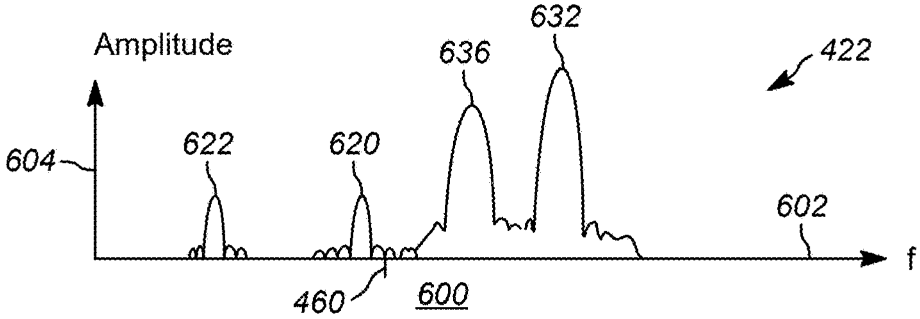
FIG. 6 illustrates a second STFT spectrum, according to an example.

FIG. 6 illustrates a second STFT spectrum 600, according to an example. The second STFT spectrum 600 is a frequency vs. amplitude plot of the second STFT vector 422 that corresponds to a Fourier transform of time sample data collected during the second depicted time interval 452. The second STFT spectrum 600 has a frequency axis 602, which corresponds to the frequency axis 404 described above and that includes the zero bin 460, and an amplitude axis 604 that depicts the amplitude of the frequency components of the second STFT vector 422. The second STFT spectrum 600 depicts amplitude values of each component of the second STFT vector 422 as opposed to the simplified indications presented in the received signal spectrogram 400. The second STFT vector 422 has a second vector first spectral peak 622 and a second vector second spectral peak 620 that corresponds to the first short time interferer 440 and the second short time interferer 442, respectively. The second STFT vector 422 also has a second vector third spectral peak 636 that corresponds to the second received signal intercept point 428 and a second vector fourth spectral peak 632 that corresponds to the first interfering signal second intercept point 432 as are discussed above.

Figure 7:
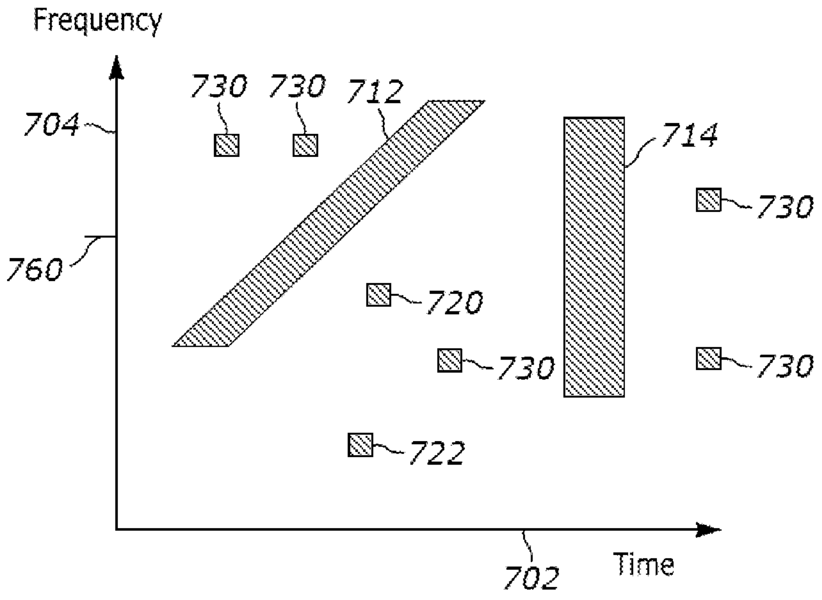
FIG. 7 illustrates an interference mask, according to an example.

FIG. 7 illustrates an interference mask 700, according to an example. The interference mask 700 is an interference mask generated by the interference mask determination and application circuit 308 based on the STFT frequency domain data depicted in the received signal spectrogram 400 described above. The processing of the interference mask determination and application circuit 308, in an example, identifies interfering signals by examining points of the received signal spectrogram 400 that exceed a value and that do not form a horizontal line. In further examples, any interference detection technique is able to be used to determine an interference mask.

Interference mask 700 is depicted with a time axis 702, which corresponds to the STFT vector corresponding to that time, and a frequency axis 704 that indicates the frequency corresponding to the STFT bins of each vector. A zero bin 760 is indicated that corresponds to the above-described zero bin of the received signal spectrogram 400.

The boxes depicted on the interference mask 700 indicate values of the two-dimensional array of STFT data stored in the two-dimensional array storage circuit 304 that are identified as interfering signals. In an example, the samples of the two-dimensional array of STFT data stored in the two-dimensional array storage circuit 304 that correspond to the samples in the boxes of the interference mask 700 are modified, such as being set to a value of zero (0), to mitigate the impact of the identified interfering signals.

The interference mask 700 indicates a diagonal box 712 that corresponds to the identified first interfering signal 412 and a vertical box 714 that corresponds to the second interfering signal 414 depicted in the received signal spectrogram 400. The interference mask 700 further includes a first short time interfering signal box 720 and a second short time interfering signal box 722 that correspond to the detected first short time interferer 440 and the second short time interferer 442, as are described above, and also depicts a number of other short time interfering signal boxes 730 that correspond to the other short time interfering signals that are depicted as dots in the received signal spectrogram 400.

In some examples, the processing described above is augmented to address certain conditions that may arise in processing received signals from multiple MIMO receiver channels. With reference to the mathematical expression of the processing depicted for the MIMO signal processing circuit block diagram 300, it has been found that combining the two real signals from two receiver channels as real and imaginary counterparts for processing by the STFT circuit 302 may give rise to a condition that affects the effectiveness of applying an interference mask to STFT data obtained for other channels of the MIMO receiver channels. Such a condition may arise when the real signals from the first two receiver channels are of similar amplitude but with phases that are in quadrature, i.e., ninety degrees (90°) out of phase, with each other. Expressed mathematically, this condition is represented by:

$$x_1 = A\cos(2\pi f_b n T_s + \theta_1) = \frac{A}{2}\left(e^{j(2\pi f_b n T_s + \theta_1)} + e^{-j(2\pi f_b n T_s + \theta_1)}\right)$$

$$x_2 = A\cos(2\pi f_b n T_s + \theta_2) = \frac{A}{2}\left(e^{j(2\pi f_b n T_s + \theta_2)} + e^{-j(2\pi f_b n T_s + \theta_2)}\right)$$

$$\text{where } \theta_2 - \theta_1 \cong 90deg$$

In this scenario, one of the frequency components will cancel out, either the positive or negative component, while the other will double in power. This is mathematically represented by:

$$z = x_1 + jx_2$$

$$z = \frac{A}{2}e^{j\theta_1}\left(e^{j(2\pi f_b n T_s)} + e^{-j(2\pi f_b n T_s)} + e^{j\frac{\pi}{2}}e^{j(2\pi f_b n T_s + \frac{\pi}{2})} + e^{j\frac{\pi}{2}}e^{-j(2\pi f_b n T_s + \frac{\pi}{2})}\right)$$

$$z = \frac{A}{2}e^{j\theta_1}\left(e^{j(2\pi f_b n T_s)} + e^{-j(2\pi f_b n T_s)} - e^{j(2\pi f_b n T_s)} + e^{-j(2\pi f_b n T_s)}\right)$$

$$z = Ae^{j\theta_1}\left(e^{-j(2\pi f_b n T_s)}\right)$$

The above scenario causes half of the interference signal cancelling itself out in the spectrogram, such as in the above received signal spectrogram 400, for the channel combination where this happens. Although such a scenario does result in the signal being reproduced by the iSTFT circuit 306, the cancelling of the signal in the spectrogram causes the interference detection algorithm to not detect and correctly eliminate that interferer when the interference mask determined for the first pair of digitized time sequences of data samples is applied to the spectrogram of other pairs of digitized time sequences of data samples that are captured during the same time interval.

A first alternative operation to address the possibility of this scenario is to apply a weight to the values in one of the digitized time sequences of data samples for the first pair of digitized time sequences of data samples 120 that is used to calculate the interference mask that is to be applied to the other pairs of digitized time sequences of data samples. In an example, the value of samples in one of the digitized time sequences of data samples is multiplied by a weight value of one half. This is represented mathematically by:

$$z = x_1 + \frac{1}{2}jx_2$$

$$z = \frac{A}{2}e^{j\theta_1}\left(e^{j(2\pi f_b n T_s)} + e^{-j(2\pi f_b n T_s)} - \frac{1}{2}e^{j(2\pi f_b n T_s)} + \frac{1}{2}e^{-j(2\pi f_b n T_s)}\right)$$

$$z = \frac{A}{2}e^{j\theta_1}\left(\frac{1}{2}e^{j(2\pi f_b n T_s)} + \frac{3}{2}e^{-j(2\pi f_b n T_s)}\right)$$

When reconstructing the signal from the output of the iSTFT circuit 386, i.e., when calculating the complex valued time domain dataset 342, the imaginary component of the iSTFT result in this example is multiplied by the inverse of the weight value, i.e., by two (2), as is shown by:

$$x_0 = iFFT\{Z^0\}$$

$$\hat{x}_1 = Re\{x_0\}$$

$$\hat{x}_2 = 2\text{Im}\{x_0\}$$

where Z0 is the spectrogram data determined from the value of "z" above, $\hat{x}_1$ is the first interference mitigated output stream 322, and $\hat{x}_2$ is the second interference mitigated output stream 324 as are described above.

Another alternative operation to address the above scenario is to augment the interference mask by calculating a "flipped" version of an initial interference mask, where the initial version of the interference map is determined as described above, and combining that flipped version of the interference mask with the calculated interference mask to create an augmented interference mask as the interference mask to apply to the STFT frequency domain data. The flipped interference mask, in an example, is calculated by mirroring, or flipping, the values of the two-dimensional interference mask around the zero (0) frequency bin, i.e., the zero bin 460 that is the middle value of the vertical axis as shown for the received signal spectrogram 400 and the interference mask 700.

In some examples, a processing circuit performing operations to calculate the STFT and iSTFT and to determine the interference mask may have limited processing efficiency for performing data manipulation such as calculating flipped interference masks and combining that flipped interference mask to an augmented interference mask. In such examples, processing speed and efficiency is able to be improved by operations where a first processing circuit is used to calculate the STFT and interference mask, and that first processing circuit sends the data defining the interference mask to a second processing circuit that performs processing on that data to calculate the flipped interference mask and create the augmented interference mask. In some such examples, the augmented interference mask is sent back to the first processing circuit to be applied to the first pair of digitized time sequences of data samples and all subsequent pairs of digitized time sequences of data samples captured during the same time interval.

An example of creating an augmented interference mask is described below. In various examples, the processing to create an augmented interference mask is able to be performed by one processor or the processing is able to be split between or among any number of processors.

Figure 8:
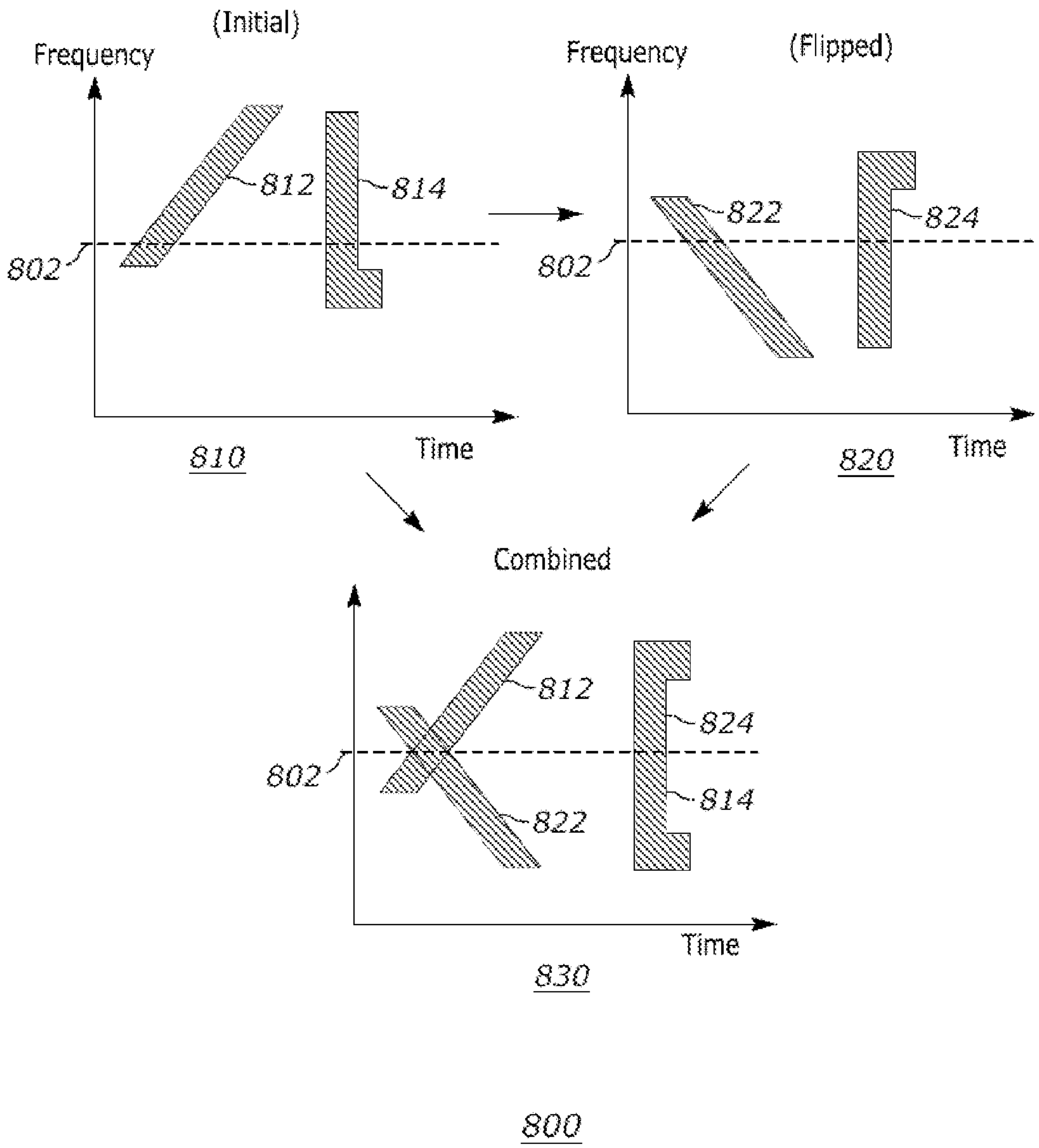
FIG. 8 depicts an interference mask augmentation process flow, according to an example.

FIG. 8 depicts an interference mask augmentation process flow 800, according to an example. The interference mask augmentation process flow 800, in an example, is performed by the interference mask determination and application circuit 308 to create an augmented interference mask as is described above.

The interference mask augmentation process flow 800 depicts an initial interference mask 810 that is determined for a particular STFT dataset. A process for determining this initial interference mask 810 is similar to that described above with regards to the interference mask 700. The initial interference mask 810 includes a first interference signal box 812 and a second interference signal box 814. The interference mask augmentation process flow 800 depicts a zero bin 802 that corresponds to the above-described zero bin 460 and 760.

The interference mask augmentation process flow 800 depicts a flipped interference mask 820. The flipped interference mask 820 is determined by transposing values of the initial interference mask 810 around the zero frequency bin 802. In an example, this processing is performed by the interference mask determination and application circuit 308.

The interference mask augmentation process flow 800 depicts a combined interference mask 820. The combined interference mask 820 is determined by combining the data of the initial interference mask 810 and the flipped interference mask 820 on an element by element basis. In an example, the combining of the data includes setting a value in each element in the combined interference mask 830 to zero if the corresponding element in either or both of the initial interference mask 810 or the flipped interference mask 820 is zero. The combined interference mask 830 is then applied to the data in the two-dimensional array storage circuit as is described above.

In an example, the processing of the interference mask determination and application circuit 308 is divided between or among two or more processor circuits. In an example, the initial interference mask 810 is performed by a first processor that performs the STFT processing of time domain signals. The data defining the initial interference mask 810 is sent to a second processor circuit where that second processor circuit performs processing to determine the flipped interference mask 820 and the combined interference mask 830. The second processor then sends data defining the combined interference mask 830 to the first processor. The first processor then applies the combined interference mask to the data within the two-dimensional array storage circuit 304 and performs the iSTFT processing. In an example, the second processor has a design that is better suited to the data manipulation processing used to determine the flipped interference mask 820 and the combined interference mask 830.

Figure 9:
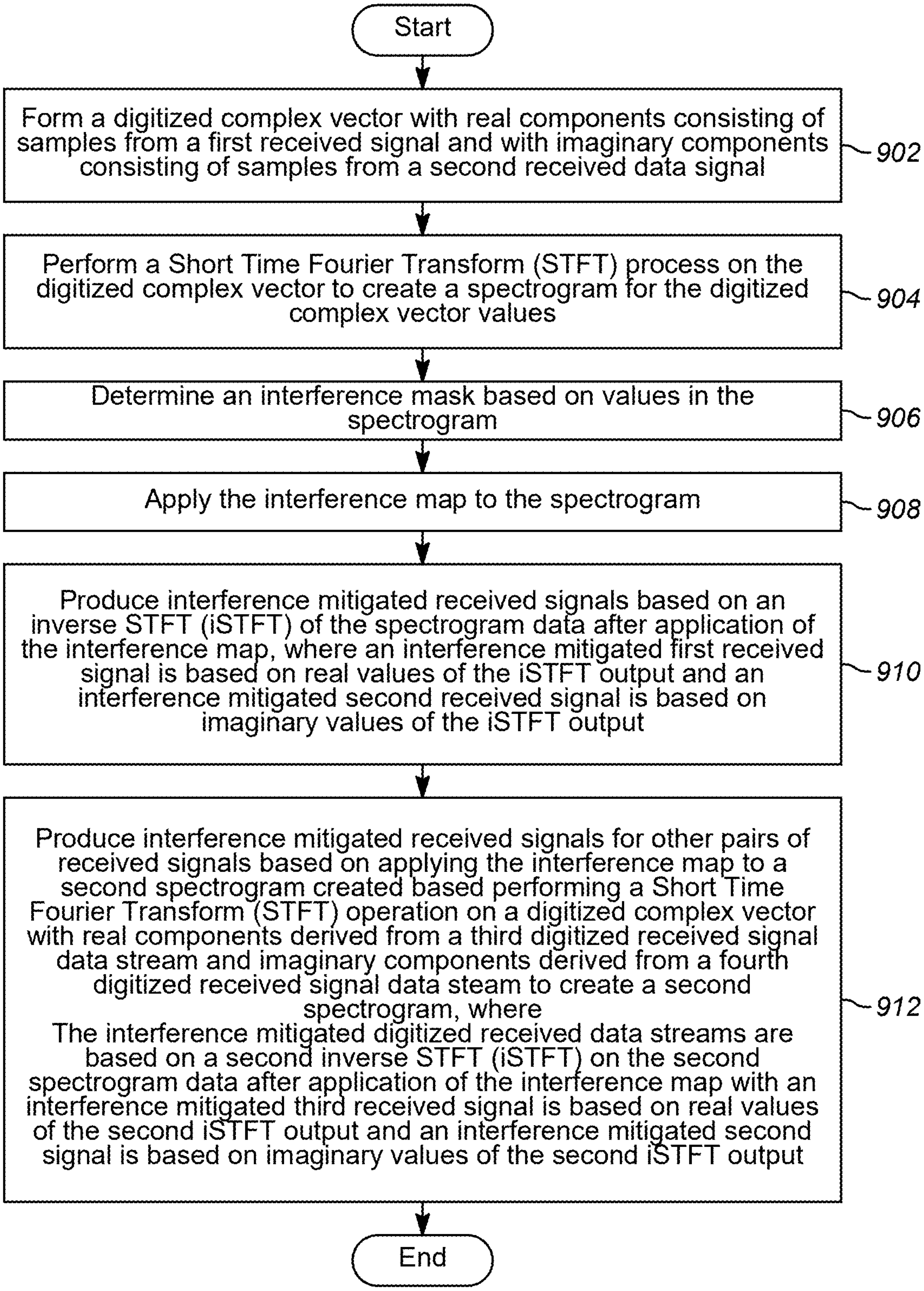
FIG. 9 illustrates an interference mitigation processing flow, according to an example.

FIG. 9 illustrates an interference mitigation processing flow 900, according to an example. The interference mitigation processing flow 900 is an example of processing performed by components within the above-described MIMO signal processing circuit block diagram 300.

The interference mitigation processing flow 900 forms, at 902, a digitized complex vector with real components consisting of samples from a first received signal and with imaginary components consisting of samples from a second received data signal. An example of this is depicted above by the STFT circuit 302 receiving a pair of digitized time sequences of data samples as the I channel and Q channel data streams, respectively.

A STFT process is performed, at 904, on the digitized complex vector to create a spectrogram for the digitized complex vector values. An example of this process is described above with regards to the processing of the STFT circuit 302.

An interference mask is determined, at 906, based on values in the created spectrogram. Examples of this determination are described above with regards to the interference mask 700 and the combined interference mask 830.

The interference mask is applied, at 908, to the spectrogram. An example of applying the interference mask is described above with regards to the interference mask 700, such as by modifying samples of the two-dimensional array of STFT data stored in the two-dimensional array storage circuit 304 that correspond to the samples in the boxes of the interference mask 700, such as by being set to a value of zero (0), to mitigate the impact of the identified interfering signals.

Interference mitigated received signals are produced, at 910, based on an inverse STFT (iSTFT) of the spectrogram data after application of the interference mask. In an example, an interference mitigated first received signal is based on real values of the iSTFT output and an interference mitigated second received signal is based on imaginary values of the iSTFT output. An example of this production is described above with regards to the iSTFT circuit 306.

In an example, the interference mask produced based on the spectrogram of the first pair of digitized time sequences of data samples 120 is applied to spectrograms determined for subsequent pairs of digitized time sequences of data samples, such as the second pair of digitized time sequences of data samples 122, that are received during the same time interval as the time intervals described above with regards to the FMCW waveform and STFT interval diagram 200. It has been observed that the correlation of interfering signals received by different receiver channels of a MIMO radar system is sufficient to effectively allow an interference mask determined based on the two signals within one pair of digitized time sequences of data samples to be applied to other pairs of digitized time sequences of data samples captured during the same time interval.

The interference mitigation processing flow 900 produces, at 912, interference mitigated received signals for other pairs of received signals based on applying the interference mask to a second spectrogram created based performing a STFT operation on a digitized complex vector with real components derived from a third digitized received signal data stream and imaginary components derived from a fourth digitized received signal data steam to create a second spectrogram. In such an operation, the interference mitigated digitized received data streams are based on a second inverse STFT (iSTFT) on the second spectrogram data after application of the interference mask with an interference mitigated third received signal is based on real values of the second iSTFT output and an interference mitigated second signal is based on imaginary values of the second iSTFT output. The interference mitigation processing flow 900 then returns to forming, at 902, a digitized complex vector with real components consisting of samples from a first received signal and with imaginary components consisting of samples from a second received data signal to process signals received during another time interval.

In an example, an interference mitigating received signal processor circuit 132 includes a Discrete Fourier Transform circuit 302 with an In-phase input channel 330 and a Quadrature input channel 332, wherein the Discrete Fourier Transform circuit is configured to calculate a Discrete Fourier Transforms 420, 422 of a received time domain signal comprising In-phase data and Quadrature data, the Discrete Fourier Transform circuit comprising a frequency domain output 314 to produce a complex valued Discrete Fourier Transform frequency domain dataset comprising a real component dataset and an imaginary component dataset. The interference mitigating received signal processor circuit also includes a received signal baseband input 340 configured to receive a first set of baseband signal values 310 received during a first time interval 220 by a first Multiple Input Multiple Output (MIMO) receiver channel 104 at the In-phase input channel, and to receive a second set of baseband signal values 312 received during the first time interval at a second MIMO receiver channel 106 to the Quadrature input channel. The interference mitigating received signal processor circuit further has an interference map determination and application circuit 308, communicatively coupled to the frequency domain output and configured to produce a complex valued interference mitigated frequency domain dataset 308 by: determining 906 an interference mask 700 based on a spectrogram dataset 400 of the complex valued Discrete Fourier Transform frequency domain dataset calculated for the first set of baseband signal values and the second set of baseband signal values, and applying 908 the interference mask to the spectrogram dataset to calculate the complex valued interference mitigated frequency domain dataset. The interference mitigating received signal processor circuit also includes an inverse Discrete Fourier Transform circuit 306 configured to: perform 908 an inverse Discrete Fourier Transform of the complex valued interference mitigated frequency domain dataset to determine an interference mitigated complex valued time domain data stream 342, produce 910 a first interference mitigated time series 322 based on real valued data within the interference mitigated complex valued time domain data stream, and produce 910 a second interference mitigated time series 324 based on imaginary valued data within the interference mitigated complex value time domain data stream.

A method for mitigating received interference includes receiving a first set of baseband signal values 310 received during a first time interval 220 by a first Multiple Input Multiple Output (MIMO) receiver channel 104 at an In-phase input channel 330 and receiving a second set of baseband signal values 312 received during the first time interval by a second MIMO receiver channel 106 at a Quadrature input channel 332. The method further includes calculating 904, with a Discrete Fourier Transform circuit comprising an In-phase input channel receiving In-phase data and a Quadrature input channel receiving Quadrature data 902, Discrete Fourier Transforms of a received time domain signal 124, 126 comprising the first set of baseband signal values as the In-phase data and the second set of baseband signal values as the Quadrature data, the Discrete Fourier Transform circuit comprising a frequency domain output 314 to produce a complex valued Discrete Fourier Transform frequency domain dataset 314 comprising a real component dataset and an imaginary component dataset. The method also includes producing 910 a complex valued interference mitigated frequency domain dataset by: determining 906 an interference mask 700 based on a spectrogram dataset 400 of the complex valued Discrete Fourier Transform frequency domain dataset calculated for the first set of baseband signal values and the second set of baseband signal values, and applying 908 the interference mask to the spectrogram dataset to calculate the complex valued interference mitigated frequency domain dataset. The method additionally includes performing 908 an inverse Discrete Fourier Transform of the complex valued interference mitigated frequency domain dataset to determine an interference mitigated complex valued time domain data stream 342, producing 910 a first interference mitigated time series 322 based on real valued data within the interference mitigated complex valued time domain data stream, and producing 910 a second interference mitigated time series 324 based on imaginary valued data within the interference mitigated complex value time domain data stream.

A computer program product for mitigating received interference includes a computer readable storage medium having computer readable program code embodied therewith that includes instructions for performing a method including receiving a first set of baseband signal values 310 received during a first time interval 220 by a first Multiple Input Multiple Output (MIMO) receiver channel 104 at an In-phase input channel 330 and receiving a second set of baseband signal values 312 received during the first time interval by a second MIMO receiver channel 106 at a Quadrature input channel 332. The method further includes calculating 904, with a Discrete Fourier Transform circuit comprising an In-phase input channel receiving In-phase data and a Quadrature input channel receiving Quadrature data 902, Discrete Fourier Transforms of a received time domain signal 124, 126 comprising the first set of baseband signal values as the In-phase data and the second set of baseband signal values as the Quadrature data, the Discrete Fourier Transform circuit comprising a frequency domain output 314 to produce a complex valued Discrete Fourier Transform frequency domain dataset 314 comprising a real component dataset and an imaginary component dataset. The method also includes producing 910 a complex valued interference mitigated frequency domain dataset by: determining 906 an interference mask 700 based on a spectrogram dataset 400 of the complex valued Discrete Fourier Transform frequency domain dataset calculated for the first set of baseband signal values and the second set of baseband signal values, and applying 908 the interference mask to the spectrogram dataset to calculate the complex valued interference mitigated frequency domain dataset. The method additionally includes performing 908 an inverse Discrete Fourier Transform of the complex valued interference mitigated frequency domain dataset to determine an interference mitigated complex valued time domain data stream 342, producing 910 a first interference mitigated time series 322 based on real valued data within the interference mitigated complex valued time domain data stream, and producing 910 a second interference mitigated time series 324 based on imaginary valued data within the interference mitigated complex value time domain data stream.

The term "coupled", as used herein, is defined as "connected" and encompasses the coupling of devices that may be physically, electrically or communicatively connected, although the coupling may not necessarily be directly and not necessarily be mechanical. The term "configured to" describes hardware, software, or a combination of hardware and software that is adapted to, set up, arranged, built, composed, constructed, designed, or that has any combination of these characteristics to carry out a given function. The term "adapted to" describes hardware, software, or a combination of hardware and software that is capable of, able to accommodate, to make, or that is suitable to carry out a given function.

The terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to invention embodiments containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The term "coupled", as used herein, is not intended to be limited to a direct coupling or a mechanical coupling, and that one or more additional elements may be interposed between two elements that are coupled.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit" or "system".

The one or more embodiments of the invention may be a system, a method, and/or a computer program product. The computer program product may include a computer-readable storage medium (or media) having computer readable program instructions thereon for causing a processor to carry out aspects of the inventive embodiments.

In one embodiment, the computer program product includes a non-transitory storage medium readable by a processing circuit and storing instructions for execution by the processing circuit for performing a method. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media, e.g., light pulses passing through a fiber-optic cable), or electrical signals transmitted through a wire.

Computer-readable program instructions for carrying out operations of the inventive embodiments may be assembler instructions, instruction-set-architecture (ISA) instructions, machine instructions, machine-dependent instructions, microcode, firmware instructions, state-setting data, or either source code or object code written in any combination of one or more programming languages, including an object-oriented programming language such as Smalltalk, C++, and conventional procedural programming languages, such as the "C" programming language or similar programming languages. The computer-readable program instructions may execute entirely or partly on a user's computer or entirely or partly on a remote computer or server. In the latter scenario, the remote computer may be connected to the user's computer through any type of network, including a local area network (LAN), a wide area network (WAN), an Ultra-Wide Band (UWB) network, or the connection may be made to an external computer (for example, through the Internet). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the inventive embodiments.

Aspects of one or more embodiments of the invention are described herein with reference to flowchart illustrations and/or block diagrams of methods, apparatus (systems), and computer program products according to embodiments of the invention. Each block of the flowchart illustrations and/or block diagrams, and combinations of blocks in the flowchart illustrations and/or block diagrams, can be implemented by computer readable program instructions.

These computer-readable program instructions may be provided to a processor of a general-purpose computer, special purpose computer, or other programmable data processing apparatus to produce a machine, such that the instructions, which execute via the processor of the computer, create means for implementing the functions/acts specified in the flowchart and/or block diagram blocks. These computer-readable program instructions may also be stored in a computer-readable storage medium that can direct a computer to function in a particular manner, such that the computer-readable storage medium having instructions stored therein comprises an article of manufacture including instructions which implement aspects of the function/act specified in the flowchart and/or block diagram block or blocks.

The description of the present disclosure has been presented for purposes of illustration and description but is not intended to be exhaustive or limited to the inventive embodiments in the form disclosed. Many modifications and variations will be apparent to those of ordinary skill in the art without departing from the scope and spirit of the inventive embodiments. One or more embodiments were chosen and described in order to best explain the principles of the inventive subject matter and the practical application and to enable others of ordinary skill in the art to understand the inventive subject matter for various embodiments with various modifications as are suited to the particular use contemplated.

Although specific embodiments of the invention have been disclosed, those having ordinary skill in the art will understand that changes can be made to the specific embodiments without departing from the spirit and scope of the inventive embodiments. The scope of the inventive subject matter is not to be restricted, therefore, to the specific embodiments, and it is intended that the appended claims cover any and all such applications, modifications, and embodiments within the scope of the inventive subject matter.

What is claimed is:

1. An interference mitigating received signal processor circuit, comprising:

a Discrete Fourier Transform circuit comprising an In-phase input channel and a Quadrature input channel, wherein the Discrete Fourier Transform circuit is configured to calculate Discrete Fourier Transforms of a received time domain signal comprising In-phase data and Quadrature data, the Discrete Fourier Transform circuit further comprising a frequency domain output to produce a complex valued Discrete Fourier Transform frequency domain dataset comprising a real component dataset and an imaginary component dataset;

a received signal baseband input configured to receive a first set of baseband signal values received during a first time interval by a first Multiple Input Multiple Output (MIMO) receiver channel at the In-phase input channel, and to receive a second set of baseband signal values received during the first time interval by a second MIMO receiver channel at the Quadrature input channel;

an interference map determination and application circuit, communicatively coupled to the frequency domain output and configured to produce a complex valued interference mitigated frequency domain dataset by:

determining an interference mask based on a spectrogram dataset of the complex valued Discrete Fourier Transform frequency domain dataset calculated for the first set of baseband signal values and the second set of baseband signal values, and applying the interference mask to the spectrogram dataset to calculate the complex valued interference mitigated frequency domain dataset; and an inverse Discrete Fourier Transform circuit configured to:

perform an inverse Discrete Fourier Transform of the complex valued interference mitigated frequency domain dataset to determine an interference mitigated complex valued time domain data stream, produce a first interference mitigated time series based on real valued data within the interference mitigated complex valued time domain data stream, and produce a second interference mitigated time series based on imaginary valued data within the interference mitigated complex valued time domain data stream.

2. The interference mitigating received signal processor circuit of claim 1, wherein:

the received signal baseband input is further configured to, when operating, receive a third set of baseband signal values received during the first time interval by a third MIMO receiver channel to the In-phase input channel, and to receive a fourth set of baseband signal values received during the first time interval by a fourth MIMO receiver channel to the Quadrature input channel;

the interference map determination and application circuit is further configured to, when operating, apply, subsequent to determining the interference mask, the interference mask to a subsequent spectrogram dataset to calculate a subsequent complex valued interference mitigated frequency domain dataset, the subsequent spectrogram dataset determined for a subsequent complex Discrete Fourier Transform frequency domain dataset calculated for the third set of baseband signal values and the fourth set of baseband signal values; and the inverse Discrete Fourier Transform circuit is further configured to, when operating:

perform an inverse Discrete Fourier Transform of the subsequent complex valued interference mitigated frequency domain dataset to determine a subsequent interference mitigated complex valued time domain data stream, produce a subsequent first interference mitigated time series based on real valued data within the subsequent interference mitigated complex valued time domain data stream, and produce a subsequent second interference mitigated time series based on imaginary valued data within the subsequent interference mitigated complex value time domain data stream.

3. The interference mitigating received signal processor circuit of claim 1, wherein the Discrete Fourier Transform circuit further comprises a Short Time Fourier Transform circuit that performs a Short Time Fourier Transform process, and the inverse Discrete Fourier Transform circuit performs an inverse Short Time Fourier Transform process.

4. The interference mitigating received signal processor circuit of claim 3, wherein the Short Time Fourier Transform circuit, when operating:

applies a weight value to one of the first set of baseband signal values or the second set of baseband signal values prior to calculating Discrete Fourier Transforms; and applies an inverse of the weight value to one of the first interference mitigated time series or the second interference mitigated time series.

5. The interference mitigating received signal processor circuit of claim 4, wherein the weight value is one half.

6. The interference mitigating received signal processor circuit of claim 1, wherein the interference map determination and application circuit comprises an interference mask determination circuit that, when operating, is configured to:

calculate an initial interference mask based on magnitude values of the complex valued Discrete Fourier Transform frequency domain dataset;

create a flipped version of the initial interference mask; and create, prior to applying the interference mask, the interference mask by at least adding the flipped version of the initial interference mask to the initial interference mask.

7. The interference mitigating received signal processor circuit of claim 6, wherein the interference mask determination circuit comprises a second processing circuit, wherein the Discrete Fourier Transform circuit, when operating, is further configured to communicate the interference mask to the second processing circuit, the second processing circuit, when operating, is configured to at least:

calculate the flipped version of the initial interference mask; and create the interference mask.

8. A method for mitigating received interference, the method comprising:

receiving a first set of baseband signal values received during a first time interval by a first Multiple Input Multiple Output (MIMO) receiver channel at an In-phase input channel;

receiving a second set of baseband signal values received during the first time interval by a second MIMO receiver channel at a Quadrature input channel;

calculating, by a Discrete Fourier Transform circuit comprising the In-phase input channel receiving In-phase data and the Quadrature input channel receiving Quadrature data, Discrete Fourier Transforms of a received time domain signal comprising the first set of baseband signal values as the In-phase data and the second set of baseband signal values as the Quadrature data, the Discrete Fourier Transform circuit further comprising a frequency domain output to produce a complex valued Discrete Fourier Transform frequency domain dataset comprising a real component dataset and an imaginary component dataset;

producing a complex valued interference mitigated frequency domain dataset by:

determining an interference mask based on a spectrogram dataset of the complex valued Discrete Fourier Transform frequency domain dataset calculated for the first set of baseband signal values and the second set of baseband signal values, and applying the interference mask to the spectrogram dataset to calculate the complex valued interference mitigated frequency domain dataset;

performing an inverse Discrete Fourier Transform of the complex valued interference mitigated frequency domain dataset to determine an interference mitigated complex valued time domain data stream;

producing a first interference mitigated time series based on real valued data within the interference mitigated complex valued time domain data stream; and producing a second interference mitigated time series based on imaginary valued data within the interference mitigated complex value time domain data stream.

9. The method claim 8, further comprising:

receiving a third set of baseband signal values received during the first time interval by a third MIMO receiver channel to the In-phase input channel;

receiving a fourth set of baseband signal values received during the first time interval by a fourth MIMO receiver channel to the Quadrature input channel;

applying, subsequent to determining the interference mask, the interference mask to a subsequent spectrogram dataset to calculate a subsequent complex valued interference mitigated frequency domain dataset, the subsequent spectrogram dataset determined for a subsequent complex Discrete Fourier Transform frequency domain dataset calculated for the third set of baseband signal values and the fourth set of baseband signal values;

performing an inverse Discrete Fourier Transform of the subsequent complex valued interference mitigated frequency domain dataset to determine a subsequent interference mitigated complex valued time domain data stream;

producing a subsequent first interference mitigated time series based on real valued data within the subsequent interference mitigated complex valued time domain data stream; and producing a subsequent second interference mitigated time series based on imaginary valued data within the subsequent interference mitigated complex value time domain data stream.

10. The method of claim 8, wherein the Discrete Fourier Transform circuit further comprises a Short Time Fourier Transform circuit, wherein calculating the Discrete Fourier Transforms comprises calculating Short Time Discrete Fourier Transforms, and wherein performing the inverse Discrete Fourier Transform comprises performing an inverse Short Time Fourier Transform process.

11. The method of claim 10, further comprising:

applying a weight value to one of the first set of baseband signal values or the second set of baseband signal values prior to calculating the Discrete Fourier Transforms; and applying an inverse of the weight value to one of the first interference mitigated time series or the second interference mitigated time series.

12. The method of claim 11, wherein the weight value is one half.

13. The method of claim 8, further comprising:

calculating an initial interference mask based on magnitude values of the complex valued Discrete Fourier Transform frequency domain dataset;

creating a flipped version of the initial interference mask; and creating, prior to applying the interference mask, the interference mask by at least adding the flipped version of the initial interference mask to the initial interference mask.

14. The method of claim 13, further comprising:

communicating the interference mask to a second processing circuit;

calculating the flipped version of the initial interference mask by the second processing circuit; and creating the interference mask by the second processing circuit.

15. A computer program product for mitigating received interference, the computer program product comprising:

a non-transitory computer-readable storage medium having computer-readable program code embodied therewith, the computer-readable program code comprising executable instructions to cause a processor to:

receive a first set of baseband signal values received during a first time interval by a first Multiple Input Multiple Output (MIMO) receiver channel at an In-phase input channel;

receive a second set of baseband signal values received during the first time interval by a second MIMO receiver channel at a Quadrature input channel;

calculate, using a Discrete Fourier Transform process comprising the In-phase input channel receiving In-phase data and the Quadrature input channel receiving Quadrature data, Discrete Fourier Transforms of a received time domain signal comprising the first set of baseband signal values as the In-phase data and the second set of baseband signal values as the Quadrature data, the Discrete Fourier Transform process further comprising a frequency domain output to produce a complex valued Discrete Fourier Transform frequency domain dataset comprising a real component dataset and an imaginary component dataset;

produce a complex valued interference mitigated frequency domain dataset by:

determining an interference mask based on a spectrogram dataset of the complex valued Discrete Fourier Transform frequency domain dataset calculated for the first set of baseband signal values and the second set of baseband signal values, and applying the interference mask to the spectrogram dataset to calculate the complex valued interference mitigated frequency domain dataset;

perform an inverse Discrete Fourier Transform of the complex valued interference mitigated frequency domain dataset to determine an interference mitigated complex valued time domain data stream;

produce a first interference mitigated time series based on real valued data within the interference mitigated complex valued time domain data stream; and produce a second interference mitigated time series based on imaginary valued data within the interference mitigated complex valued time domain data stream.

16. The computer program product of claim 15, further comprising executable instructions to cause the processor to:

receive a third set of baseband signal values received during the first time interval by a third MIMO receiver channel to the In-phase input channel;

receive a fourth set of baseband signal values received during the first time interval by a fourth MIMO receiver channel to the Quadrature input channel;

apply, subsequent to determining the interference mask, the interference mask to a subsequent spectrogram dataset to calculate a subsequent complex valued interference mitigated frequency domain dataset, the subsequent spectrogram dataset determined for a subsequent complex Discrete Fourier Transform frequency domain dataset calculated for the third set of baseband signal values and the fourth set of baseband signal values;

perform an inverse Discrete Fourier Transform of the subsequent complex valued interference mitigated frequency domain dataset to determine a subsequent interference mitigated complex valued time domain data stream;

produce a subsequent first interference mitigated time series based on real valued data within the subsequent interference mitigated complex valued time domain data stream; and produce a subsequent second interference mitigated time series based on imaginary valued data within the subsequent interference mitigated complex value time domain data stream.

17. The computer program product of claim 15, wherein the executable instructions to calculate the Discrete Fourier Transforms further comprise executable instructions to calculate Short Time Fourier Transforms, wherein the executable instructions to perform the inverse Discrete Fourier Transform comprise executable instructions to perform an inverse Short Time Fourier Transform process.

18. The computer program product of claim 17, further comprising executable instructions to cause the processor to:

apply a weight value to one of the first set of baseband signal values or the second set of baseband signal values prior to calculating the Discrete Fourier Transforms; and apply an inverse of the weight value to one of the first interference mitigated time series or the second interference mitigated time series.

19. The computer program product of claim 15, further comprising executable instructions to cause the processor to:

calculate an initial interference mask based on magnitude values of the complex valued Discrete Fourier Transform frequency domain dataset;

create a flipped version of the initial interference mask; and create, prior to applying the interference mask, the interference mask by at least adding the flipped version of the initial interference mask to the initial interference mask.

20. The computer program product of claim 19, further comprising executable instructions to cause the processor to:

communicate the interference mask to a second processing circuit;

calculate the flipped version of the initial interference mask by the second processing circuit; and create the interference mask by the second processing circuit.

* * * * *